United States Patent
Hey et al.

[19]

[11] Patent Number: 6,131,850
[45] Date of Patent: Oct. 17, 2000

[54] ADJUSTABLE LENGTH BRACE FOR CYCLIC LOADS

[75] Inventors: Kenneth E. Hey, Seattle; John H. Polk, Brier, both of Wash.

[73] Assignee: The Boeing Company, Seattle, Wash.

[21] Appl. No.: 09/096,338

[22] Filed: Jun. 12, 1998

[51] Int. Cl.[7] .......................... B64D 27/00; B64C 27/00; F16B 1/00; F16D 1/00; F16L 23/00

[52] U.S. Cl. .......................... 244/54; 244/53 R; 244/55; 244/17.27; 403/337; 52/726.1; 52/726.2

[58] Field of Search .............................. 244/54, 55, 53 R, 244/17.27; 60/39.31; 403/57, 74, 157, 337; 52/726.1, 726.2

[56] References Cited

U.S. PATENT DOCUMENTS

| | | | |
|---|---|---|---|
| 1,584,053 | 5/1926 | Wait, Jr. | 244/54 |
| 2,965,338 | 12/1960 | McLean | 244/54 |
| 3,327,965 | 6/1967 | Bockrath | 244/54 |
| 3,675,418 | 7/1972 | Lenkeit et al. | 244/54 |
| 4,162,860 | 7/1979 | Mengeringhausen et al. | 403/337 |
| 4,192,153 | 3/1980 | Fisher | 403/57 |
| 4,253,776 | 3/1981 | Orain | 403/337 |
| 4,279,530 | 7/1981 | Mullenberg | 403/337 |
| 4,346,861 | 8/1982 | Legrand et al. | 244/54 |
| 4,437,627 | 3/1984 | Moorehead | 244/54 |
| 4,531,694 | 7/1985 | Soloy | 244/54 |
| 4,571,936 | 2/1986 | Nash et al. | 60/39.31 |
| 4,583,960 | 4/1986 | Joyner | 403/57 |
| 4,603,821 | 8/1986 | White | 244/54 |
| 4,758,109 | 7/1988 | Little et al. | 403/337 |
| 4,881,924 | 11/1989 | Gall | 403/57 |
| 5,086,997 | 2/1992 | Glass | 244/123 |
| 5,271,685 | 12/1993 | Stark | 403/337 |
| 5,467,941 | 11/1995 | Chee | 244/54 |
| 5,613,580 | 3/1997 | Young | 188/300 |
| 5,641,185 | 6/1997 | Harth | 285/187 |
| 5,651,629 | 7/1997 | Wall et al. | 403/337 |
| 5,873,547 | 2/1999 | Dunstan | 244/54 |

Primary Examiner—Michael J. Carone
Assistant Examiner—Fredrick T. French, III
Attorney, Agent, or Firm—Robert P. Richardson

[57] ABSTRACT

A brace for cyclic loads includes a tube having first and second ends and a tube wall and a tube axis. The tube wall defines a plurality of first bores radially arranged about the first and second ends of the tube. The first bores extend through the tube wall along first bore axes that are substantially aligned axially with the tube axis. A first end fitting is removably attached to the first end of the tube at an end of the first end fitting. The end of the first end fitting defines a plurality of second bores that have second bore axes. The plurality of second bores are substantially aligned axially and radially with the plurality of first bores. A second end fitting is removably attached to the second end of the tube at an end of the second end fitting. The end of the second end fitting defines a plurality of third bores having third bore axes. The plurality of third bores are substantially aligned axially and radially with the pluralities of first and second bores. A plurality of fasteners are disposed within the first, second, and third bores, and the plurality of fasteners provides a load path that is aligned with the tube axis and not normal to the tube axis.

30 Claims, 7 Drawing Sheets

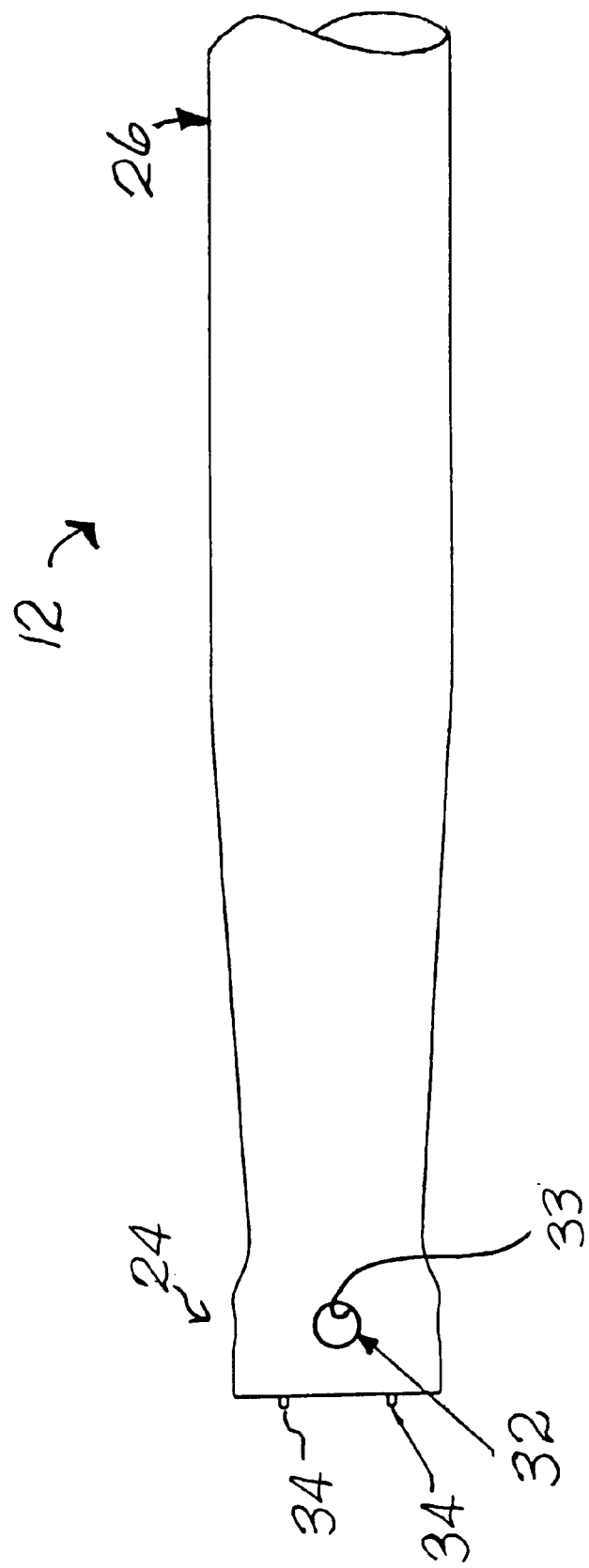

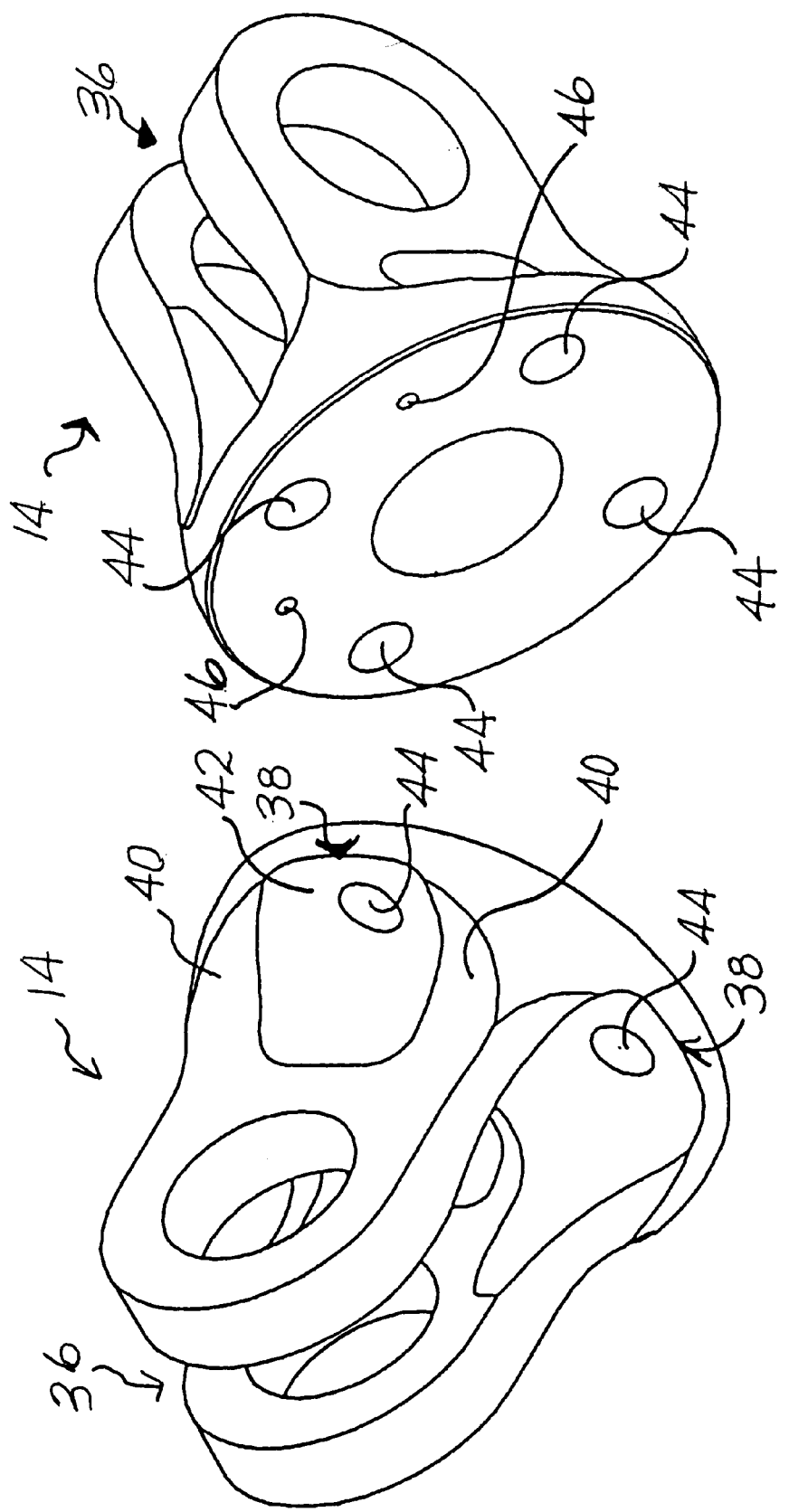

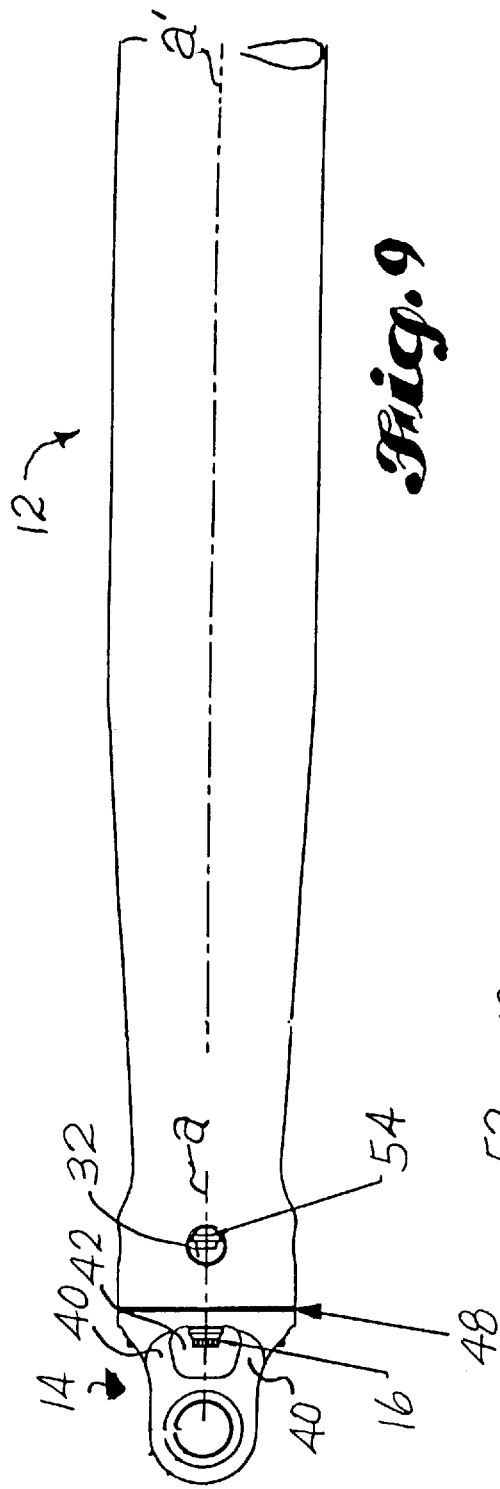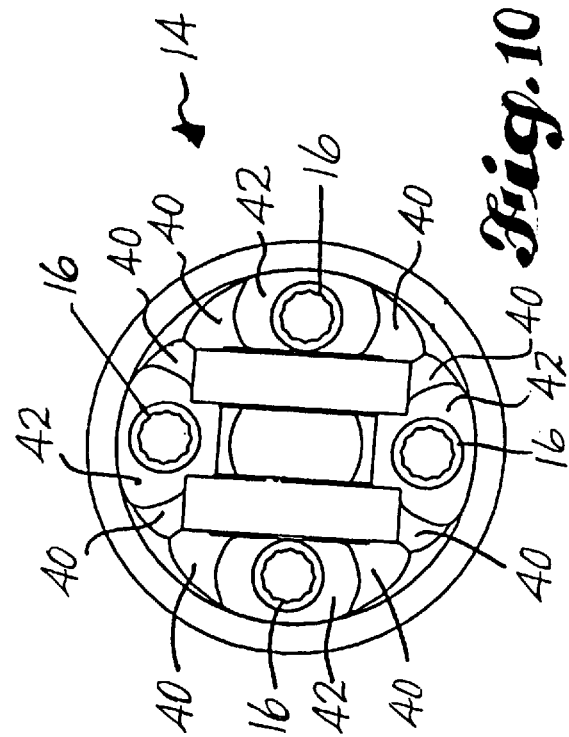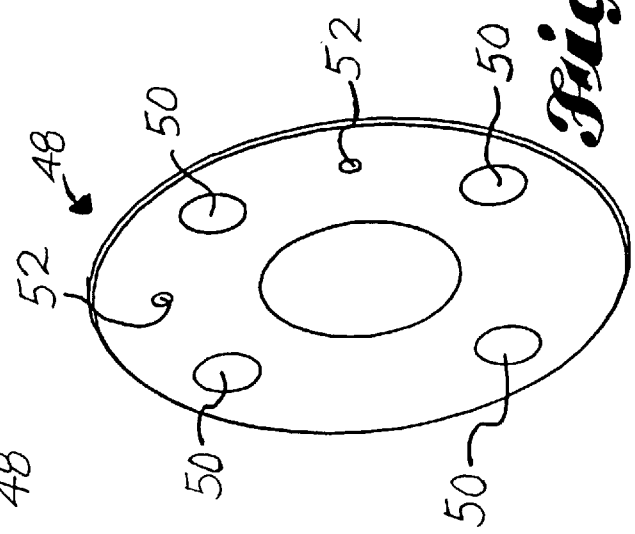

ADJUSTABLE LENGTH BRACE FOR CYCLIC LOADS

FIELD OF THE INVENTION

This invention relates to a brace for high cyclic loads and, more particularly, to a brace for connecting an aircraft engine strut to an aircraft wing.

BACKGROUND OF THE INVENTION

A diagonal brace is a link that structurally connects an airplane engine strut to an airplane wing. A typical brace known in the art includes a tub body of a suitable material, such as aluminum or titanium, with clevis yokes fastened at each end of the tube.

The means for retaining the yoke to the tube has been a source of performance-related problems, service-related problems, problems in fabricating the brace, and problems in final assembly of an airplane. Specifically, high cyclic, compressive and tensile loading tends to loosen and degrade the fatigue performance of the brace at holes for shear fasteners located about the periphery of the brace at the concentric clevis yoke and tube member interface. Also, the concentric clevis yoke and tube member interface is difficult to inspect in-service for internal cracking, and is expensive and complicated to produce. Further, the permanent fasteners do not allow changes in the length of the brace during final assembly of an airplane. Instead, a custom-length brace must be fabricated and installed out of sequence during airplane final assembly. Finally, shear fasteners currently known in the art are undesirable for composite tube members.

BRIEF SUMMARY OF THE INVENTION

The invention is a brace for cyclic loads that overcomes the shortcomings in braces known in the prior art. The brace includes a tube having a tube wall and a tube axis. The tube wall defines the plurality of first bores that are radially arranged about an end of the tube, and the first bores extend through the tube wall along first bore axes that are substantially aligned axially with the tube axis. An end fitting has an end and is removably attached to the end of the tube. Another end of the tube defines a plurality of second bores having second bore axes. The plurality of second bores are substantially aligned axially and radially with the plurality of first bores. A plurality of fasteners are disposed within the first and second bores and removably attach the end of the end fitting to the end of the tube, such that the fasteners provide a load path that is aligned with the tube axis when the end fitting is attached to the tube.

According to an aspect of the invention, cyclic loading is minimized and fatigue is reduced. The fasteners are tightened such that the tube and end fittings are held in compression that is greater than expected loading. Thus, the tube-to-end fitting joint is not subject to reversing loads. Further, the bores in the tube wall are arranged axially about the tube wall instead of radially about the periphery of the tube.

According to another aspect of the invention, the length of the brace is adjustable, even during final assembly of an airplane. Spacer disks can be inserted between the end fitting and the tube.

BRIEF DESCRIPTION OF THE SEVERAL VIEWS OF THE DRAWINGS

FIG. 4 is a plan view of the tube of FIG. 3;

FIG. 5 is a perspective view of an end fitting;

FIG. 6 is another perspective view of the end fitting of FIG. 5;

FIG. 8 is a perspective view of a spacer;

FIG. 9 is a plan view of the brace of the inventor; and

FIG. 10 is an end view of the brace of FIG. 9.

DETAILED DESCRIPTION OF THE INVENTION

Figure 1:
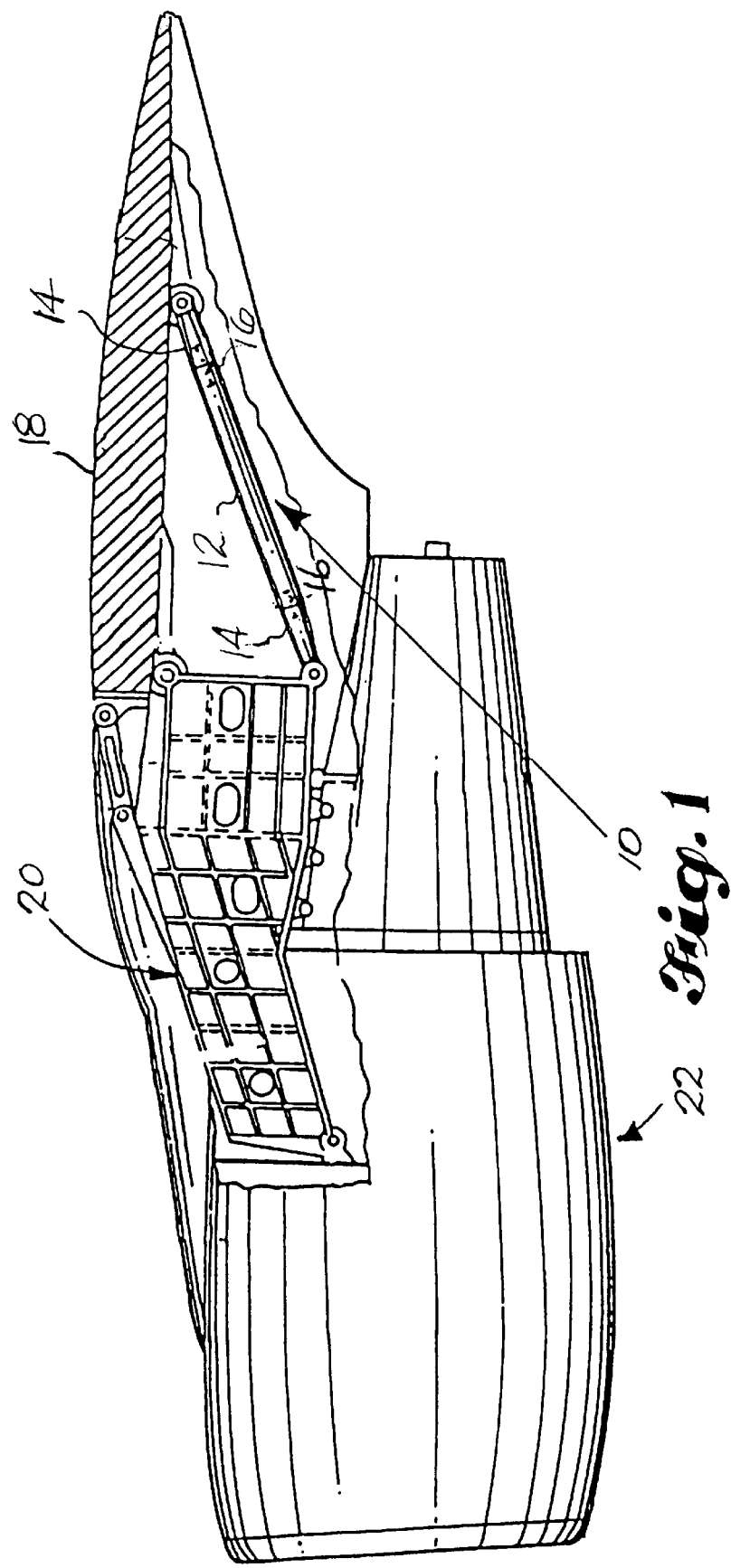
FIG. 1 is a plan view of a brace of the invention in use in an airplane.
Figure 2:
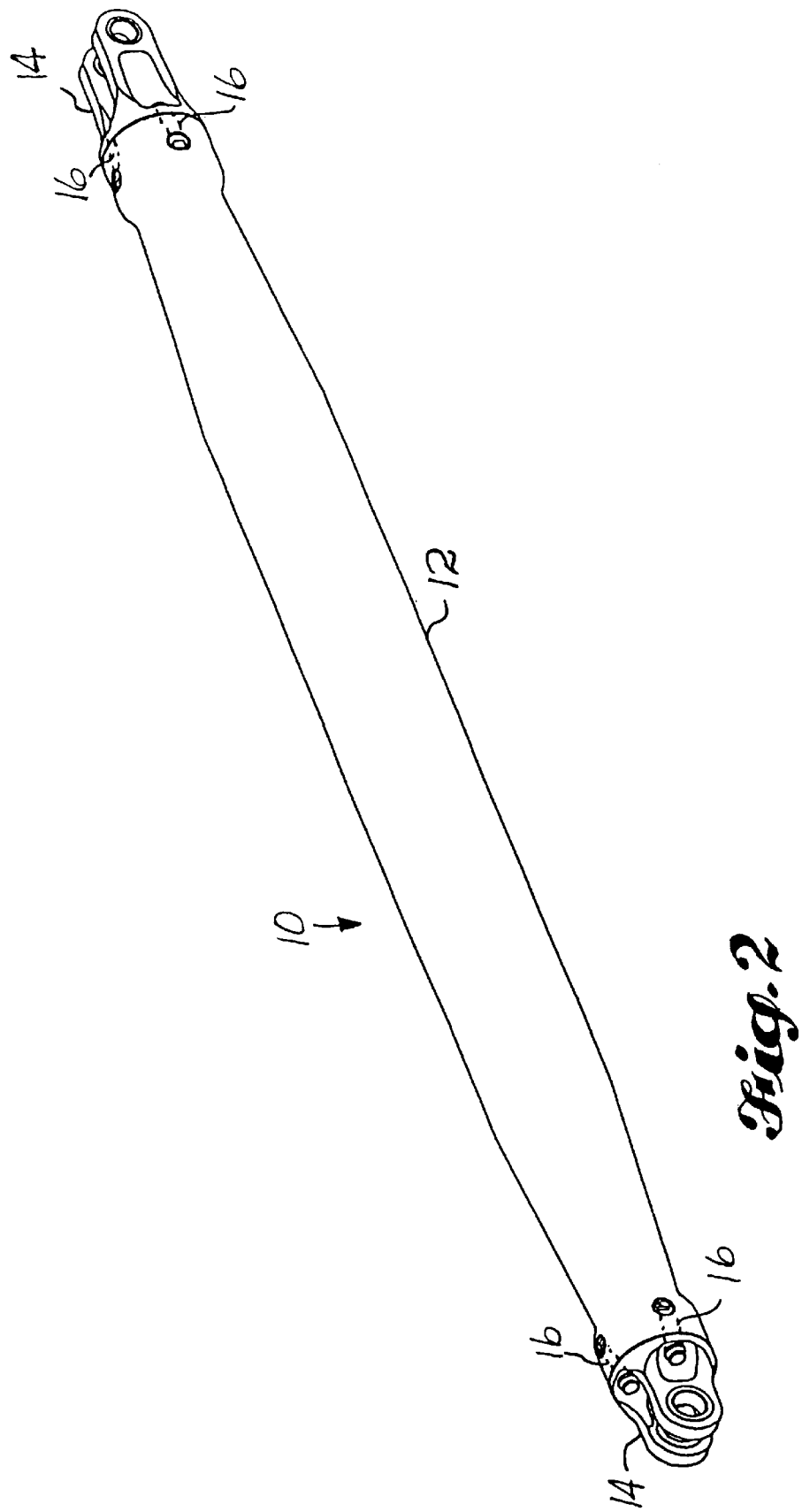
FIG. 2 is a perspective view of the brace of the invention.

FIG. 1 shows a brace 10 according to the invention that is installed in an airplane. The brace 10 includes a tube 12 and end fittings 14. Referring now to FIGS. 1 and 2, fasteners 16, shown in phantom, are pre-loaded to hold the tube 12 and end fittings 14 together in compression, and provide a load path axially through the fasteners that is aligned with the tube 12. In the example of FIG. 1, the brace 10 is attached to an airplane wing 18 at one of the end fittings 14, and to a strut box 20 for an engine 22 at the other end fitting 14. It will be appreciated that the arrangement shown in FIG. 1 is given by way of non-limiting example only. The brace 10 may be used for a wide range of applications in which it is desired to support a high cyclic load.

Figure 3:
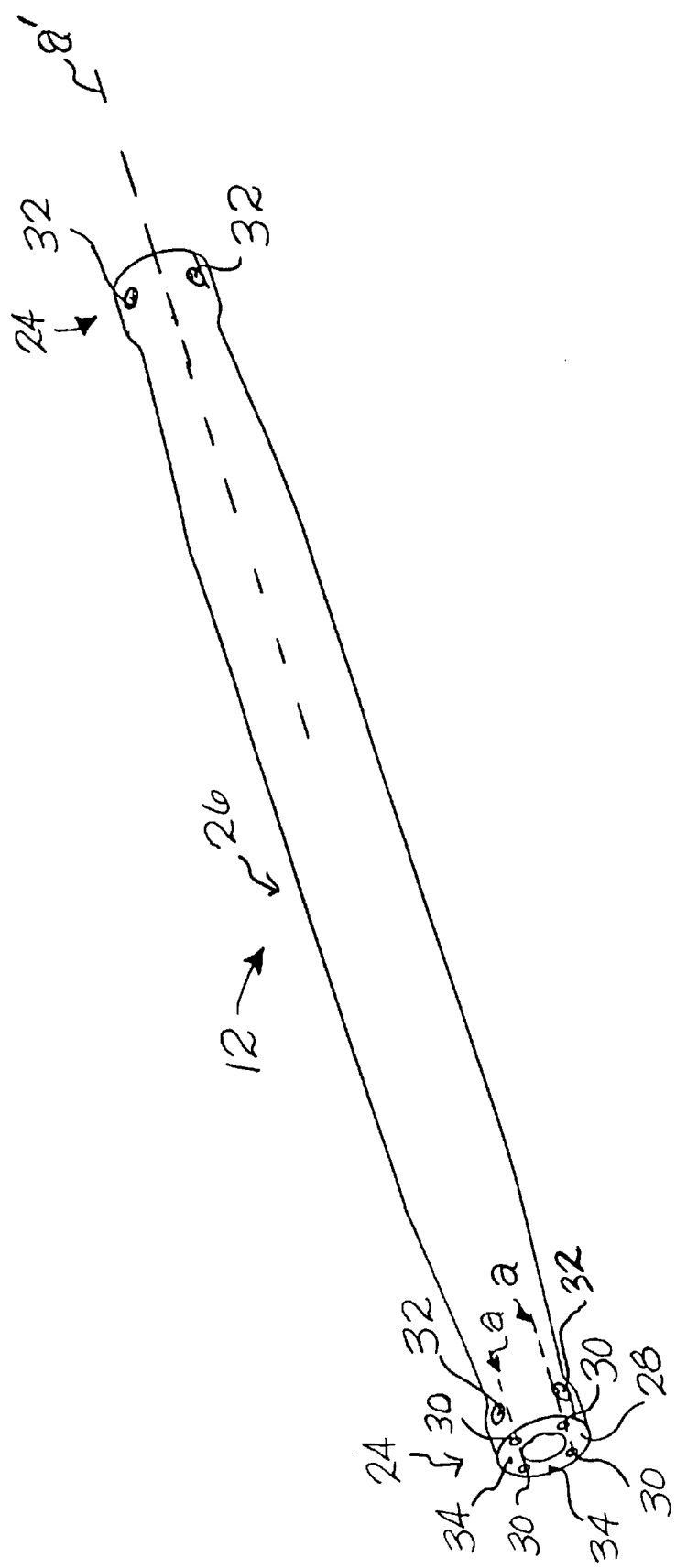
FIG. 3 is a perspective view of a tube.

FIGS. 3 and 4 show the tube 12. The tube 12 is a swaged tube and includes ends 24 and a middle section 26 that is disposed between the ends 24. The tube 12 has a tube wall 28. The tube wall 28 has a tube wall thickness that is selected appropriately for the loading of the brace 10. If desired, the tube wall thickness may taper to a thinner thickness in the middle section 26 in order to save weight without compromising the load carrying capability of the brace 10.

Bores 30 extend from the ends 24 a finite distance toward the middle section 26. Ends of the bores 30 are accessible via holes 32. The interior of each hole 32 may be lined with an optional sleeve 33 (FIG. 4) made of a hard metal, such as steel, when the tube 12 is made of a softer metal, such as aluminum. The bores 30 extend along bore axes a that are aligned with axis a' of the tube 12. Optional protrusions 34 extend from the ends 24. As will be discussed later, the protrusions 34 are provided for aligning the end fittings 14 and the tube 12. This feature allows for ease of disassembly and reassembly, adjustment of length, and inspection. It is desirable that the tube 12 be made of a material with high strength characteristics that also provide ease of manufactureability. A suitable material for the tube 12 is aluminum. If it is desired to save weight, the tube 12 may be made of titanium or a composite material, such as graphite epoxy.

Figure 7:
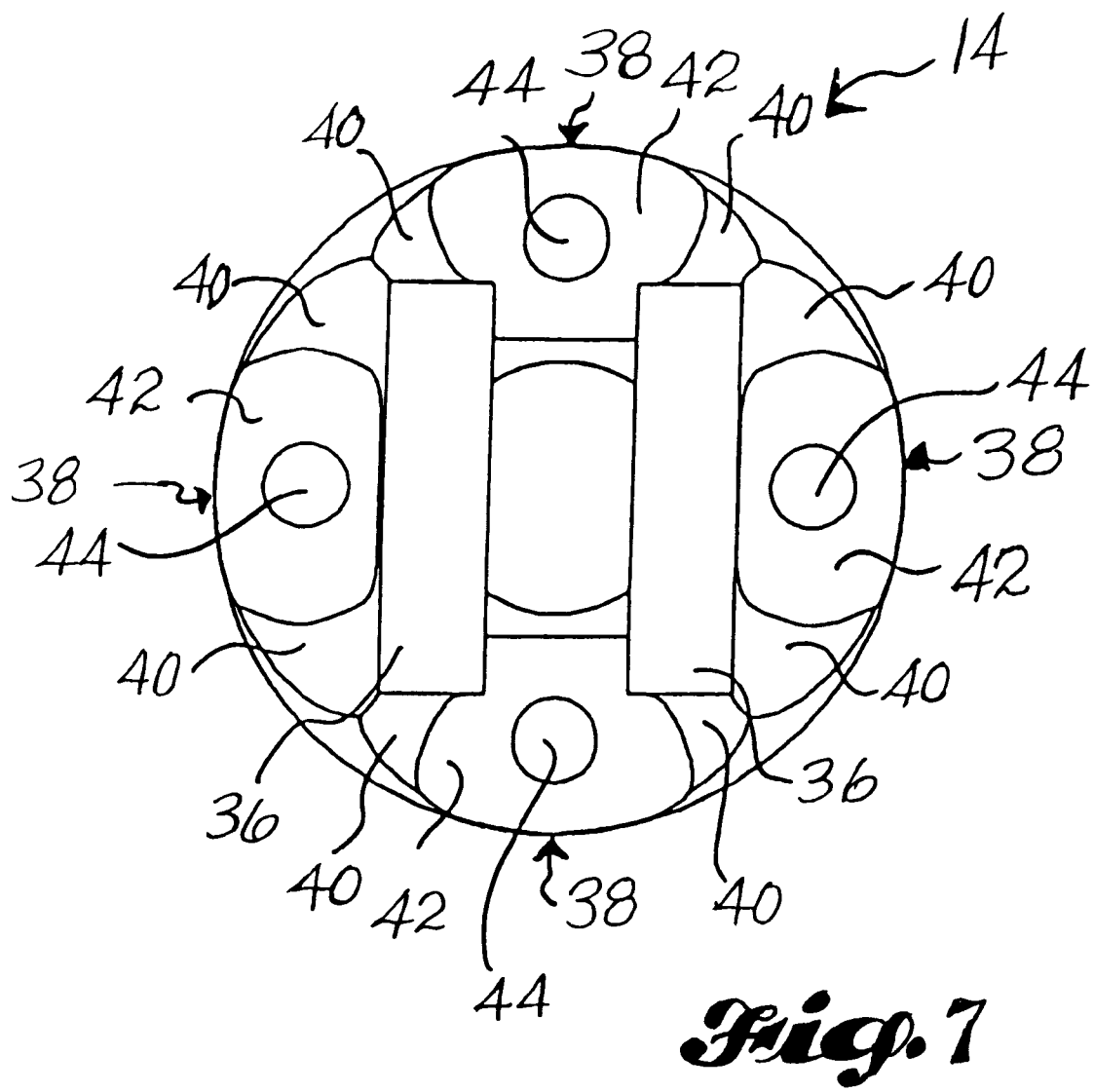
FIG. 7 is an end view of the end fitting of FIG. 5.

FIGS. 5 through 7 show the end fittings 14. The end fitting 14 is machined and suitably includes a clevis 36 for attachment to a work piece, such as an airplane wing 18 (FIG. 1) or a strut box 20 (FIG. 1), if desired. It will be appreciated that other suitable means for attaching an end fitting 14 may be provided as is known in the art. Fittings 38 each include two ribs 40 and a web 42. Bores 44 are defined in each web 42 and extend through the end fitting 14. The fittings 38 support the bores 44 and transfer load from the clevis 36 to the ribs 40. While four of the fittings 38 and bores 44 have been shown to provide an optimized geometry for providing a load path, it will be appreciated that it is not necessary for the invention for the end fitting 14 to have four of the fittings 38 and bores 44. Any number of fittings 38 and bores 44 may be used as determined by any particular application.

Recesses 46 in the end of the end fitting 14 are provided to align the end fitting 14 with the tube 12. The protrusions 34 (FIGS. 3 and 4) of the tube 12 mate with the recesses 46. The recesses 46 and protrusions 34 (FIGS. 3 and 4) are located such that, when mated, the bores 30 of the tube 12 align axially and radially with the bores 44 of the end fitting 14. It will be appreciated that it is not necessary for the invention that the protrusions 34 be provided on the tube 12 and the recesses 46 be defined within the end fittings 14. Instead, the protrusions 34 may be provided on the end fittings 14 and the recesses defined within the tube 12. The end fittings 14 are made of any suitable hard-metal material having high strength characteristics and providing ease of manufactureability. A suitable material for the end fittings 14 is steel. If it is desired to save weight, the end fittings 14 may be made of the titanium or a composite material, such as without limitation graphite epoxy.

FIG. 8 shows a spacer 48 for adjusting the length of the brace 10. The spacer 48 is a disk made of aluminum, titanium, or a composite material, such as without limitation graphite epoxy. The spacer 48 is sized to have a diameter that is equalized with the diameters of the end fittings 14 and the ends 24 of the tube 12. The spacer 48 includes holes 50 that are sized and located about the disk 48 to align with the bores 30 of the tube 12 and the bores 44 of the end fitting 14. The spacer 48 also includes holes 52. The holes 52 are sized and positioned about the spacer 48 such that the protrusions 34 of the tube 12 can be received therethrough. The spacer 48 may have a thickness as desired for adjusting the length of the brace 10. A thinner spacer 48 provides greater stability in the length of the brace 10. In order to utilize the alignment features provided by the protrusion 34 and the recess 46, the combined thickness of all the spacers 48 should not exceed the length of the protrusion 34.

FIGS. 9 and 10 show the end fitting 14 attached to the tube 12. One spacer 48 is shown between the tube 12 and the end fitting 14. However, it will be appreciated that the use of any spacer 48 is optional and is shown for illustrative purposes only. The tube 12, the end fitting 14, and the spacer 48 are lined such that the protrusions 34 of the tube 12 are received within the holes 52 of the spacer 48 and the recesses 46 of the end fitting 14. As a result, the bores 30, the holes 50 and the bores 44 are aligned axially and radially, and are arranged for receiving the fasteners 16. The fasteners 16 are placed within the bores 30, the holes 50, and the bores 44. The fasteners 16 are suitably threaded bolts that are threadedly engaged by nuts 54, such as barrel nuts. The fastener 16 preferably includes a locking feature to prevent the fastener 16 from backing out. The nut 54 is preferably held in place by a retainer clip (not shown) before the fastener 16 is inserted. The fasteners 16 are pre-loaded with a sufficient torque such that the tube 12 and end fitting 14 are held in compression regardless of the loading. In other words, the pre-loading of the fasteners 16 is greater than any tension load to which the brace 10 is expected to be subjected. Thus, the joint of the tube 12 and the end fitting 14 is not subject to reversing loads. When installed, the optional sleeve 33 more evenly distributes the load from the nuts 54 to the wall of the tube 12. It will be appreciated that the fasteners 16 provide a load path along the axis a that are aligned with the tube axis a'.

It will be appreciated that, although various embodiments of the invention have been described herein for purposes of illustration, modifications may be made without departing from the spirit and scope of the invention. Accordingly, the invention is not limited except as by the appended claims.

What is claimed is:

1. A brace for cyclic loads, the brace comprising:
   a tube having first and second ends, a tube wall and a tube axis, the tube wall defining a plurality of first bores radially arranged about the first and second ends of the tube, the first bores extending through the tube wall along the first bore axes that are substantially aligned axially with the tube axis, the tube defining a plurality of holes in communication with the plurality of first bores and an exterior periphery of the tube wall;
   a first end fitting that is removably attached to the first end of the tube at an end of the first end fitting, the end of the first end fitting defining a plurality of second bores having second bore axes, the plurality of second bores being substantially aligned axially and radially with the first bores;
   a second end fitting that is removably attached to the second end of the tube at an end of the second end fitting, the end of the second end fitting defining a plurality of third bores having third bore axes, the plurality of third bores being substantially aligned axially and radially with the plurality of first bores; and
   a plurality of fasteners that are disposed within the first, second and third bores, the plurality of fasteners providing a load path that is aligned with the tube axis and not normal to the tube axis.

2. The brace of claim 1, further comprising a spacer disk inserted between the tube and one of the first and second end fittings, the spacer disk defining a plurality of fourth bores that are substantially aligned radially with the first, second, and third bores.

3. The brace of claim 1, further comprising means for aligning the first and second bores.

4. The brace of claim 3, wherein the aligning means includes two protrusions and two recesses, the recesses being arranged for receiving the protrusion.

5. The brace of claim 1, wherein the plurality of fasteners include threaded bolts.

6. The brace of claim 5, further comprising nuts threadedly engaged with the bolts, such that the tube and the first and second end fittings are held in compression.

7. The brace of claim 1, wherein the first and second end fittings are made of titanium.

8. The brace of claim 7, wherein the tube is made of aluminum.

9. The brace of claim 7, wherein the tube is made of a composite material.

10. The brace of claim 1, wherein the first and second end fittings are made of steel.

11. The brace of claim 10, wherein the tube is made of aluminum.

12. The brace of claim 1, wherein the tube is made of aluminum.

13. The brace of claim 1, wherein the tube and the first and second end fitting are made of a composite material.

14. The brace of claim 1, wherein the tube is made of a metal having a first hardness and each hole is lined with a metal sleeve having a second hardness that is harder than the first hardness.

15. A brace for supporting an object, the brace being subject to loads that cycle between tension and compression, the brace comprising;
   a tube having first and second ends, a tube wall and a tube axis, the tube wall defining a plurality of first bores radially arranged about the first and second ends of the tube, the first bores extending through the tube wall along the first bore axes that are substantially aligned axially with the tube axis, the tube defining a plurality of holes in communication with the plurality of first bores and an exterior periphery of the tube wall;

a first end fitting that is removably attached to the first end of the tube at an end of the first end fitting, the end of the first end fitting defining a plurality of second bores having second bore axes, the plurality of second bores being substantially aligned axially and radially with the first bores;

a second end fitting that is removably attached to the second end of the tube at an end of the second end fitting, the end of the second end fitting defining a plurality of third bores having third bore axes, the plurality of third bores being substantially aligned axially and radially with the plurality of first bores; and a plurality of fasteners that are disposed within the first, second and third bores, the plurality of fasteners providing a load path that is aligned with the tube axis and not normal to the tube axis, the plurality of fasteners including pre-loaded threaded bolts that are threadedly engaged with nuts with pre-loading greater than tension leads to which the brace is expected to be subjected, such that the tube and the first and second end fittings are held in compression regardless of cyclic loads to which the brace is expected to be subjected.

16. The brace of claim 15, further comprising a spacer disk inserted between the tube and one of the first and second end fittings, the spacer disk defining a plurality of fourth bores that are substantially aligned radially with the first, second, and third bores.

17. The brace of claim 14, further comprising means for aligning the first and second bores.

18. The brace of claim 17, wherein the aligning means includes two protrusions and two recesses, the recesses being arranged for receiving the protrusions.

19. The brace of claim 15, wherein the first and second end fittings are made of titanium.

20. The brace of claim 19, wherein the tube is made of aluminum.

21. The brace of claim 19, wherein the tube is made of a composite material.

22. The brace of claim 15, wherein the first and second end fittings are made of steel.

23. The brace of claim 22, wherein the tube is made of aluminum.

24. The brace of claim 15, wherein the tube is made of aluminum.

25. The brace of claim 15, wherein the tube and the first and second end fittings are made of a composite material.

26. The brace of claim 15, wherein the object includes an aircraft engine;

wherein the first end fitting has a second end that is arranged for attachment to an airplane wing; and wherein the second end fitting has a second end that is arranged for attachment to a strut box for an aircraft engine.

27. The brace of claim 15, wherein the tube is made of a metal having a first hardness and each hole is lines with a metal sleeve having a second hardness that is harder than the first hardness.

28. A brace for supporting an aircraft engine, the brace being subject to loads that cycle between tension and compression, the brace comprising:

a tube having first and second ends, a tube wall and a tube axis, the tube wall defining a plurality of first bores radially arranged about the first and second ends of the tube, the first bores extending through the tube wall along the first bore axes that are substantially aligned axially with the tube axis, the tube defining a plurality of holes in communication with the plurality of first bores and an exterior periphery of the tube wall;

a first end fitting that is removably attached to the first end of the tube at an end of the first end fitting, the end of the first end fitting defining a plurality of second bores having second bore aces, the plurality of second bores being substantially aligned axially and radially with the first bores, the first end fitting having a second end that is arranged for attachment to an airplane wing;

a second end fitting that is removably attached to the second end of the tube at an end of the second end fitting, the end of the second end fitting defining a plurality of third bores having third bore axes, the plurality of third bores being substantially aligned axially and radially with the plurality of first bores, the second end fitting having a second end that is arranged for attachment to a strut box for an aircraft engine; and a plurality of fasteners that are disposed within the first, second and third bores, the plurality of fasteners providing a load path that is aligned with the tube axis and not normal to the tube axis, the plurality of fasteners including pre-loaded threaded bolts that are threadedly engaged with nuts with pre-loading greater than tension loads to which the brace is expected to be subjected, such that the tube and the first and second end fitting are held in compression regardless of cyclic loads to which the brace is expected to be subjected.

29. The brace of claim 15, further comprising a spacer disk inserted between the tube and one of the first and second end fittings, the spacer disk defining a plurality of fourth bores that are substantially aligned radially with the first, second, and third bores.

30. The brace of claim 28, wherein the tube is made of a metal having a first hardness and each hole is lined with a metal sleeve having a second hardness that is harder than the first hardness.

* * * * *